United States Patent [19]

Brierley et al.

[11] 4,330,468
[45] May 18, 1982

[54] WATER SOLUBLE MONOAZO DYES FOR NYLON

[75] Inventors: David Brierley; Denis R. A. Ridyard; Michael Yelland, all of Manchester, England

[73] Assignee: Imperial Chemical Industries, Limited, London, England

[21] Appl. No.: 928,260

[22] Filed: Jul. 26, 1978

Related U.S. Application Data

[63] Continuation of Ser. No. 768,622, Feb. 14, 1977, abandoned.

[30] Foreign Application Priority Data

Mar. 30, 1976 [GB] United Kingdom ............... 12735/76

[51] Int. Cl.³ .................... C09B 29/01; C09B 29/30; D06P 1/39; D06P 3/24
[52] U.S. Cl. ............................... 260/198; 260/458 C; 260/507 R; 260/509; 260/543 R; 560/13; 564/86
[58] Field of Search ............................... 260/198, 199

[56] References Cited

U.S. PATENT DOCUMENTS 1,854,846  4/1932  Knecht et al. ................ 260/198
3,284,436  11/1966  Frisch ........................ 260/198

FOREIGN PATENT DOCUMENTS 2063907  7/1971  Fed. Rep. of Germany ...... 260/198
1550030  11/1968  France ........................ 260/198
465955   5/1937  United Kingdom ............. 260/198
953544   3/1964  United Kingdom ............. 260/198

Primary Examiner—Floyd D. Higel
Attorney, Agent, or Firm—Cushman, Darby & Cushman

[57] ABSTRACT

Water-soluble monoazo dyes for nylon having the formula:

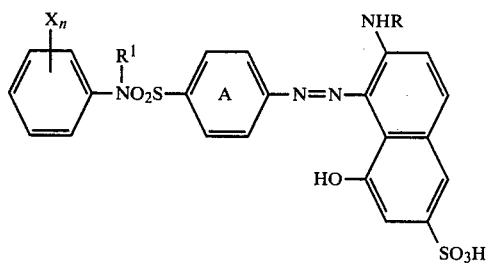

wherein ring A may optionally be substituted by halogen, trifluoromethyl, alkoxy, acylamino or alkyl having from 1 to 4 carbon atoms, R represents hydrogen or unbranched alkyl having from 1 to 4 carbon atoms, $R^1$ represents hydrogen, alkyl or hydroxyalkyl, X represents unbranched alkyl having from 1 to 6 carbon atoms, cycloalkyl, halogen, nitro, trifluoromethyl, sulpho, vinylsulphonyl, hydroxyethylsulphonyl, sulphatoethylsulphonyl, $-SO_2NHR^2$, wherein $R^2$ represents hydrogen or alkyl having from 1 to 4 carbon atoms, or $-COOR^3$ wherein $R^3$ represents hydrogen, alkyl having from 1 to 7 carbon atoms, cycloalkyl or aryl, and n represents an integer of from 0 to 3.

The dyes are suitable for application to polyamide textile materials. They give a high degree of thermal stability and fastness to wet treatments and to light.

2 Claims, No Drawings

WATER SOLUBLE MONOAZO DYES FOR NYLON

This is a continuation of Application Ser. No. 768,622 filed Feb. 14, 1977, now abandoned.

This invention relates to monoazo dyes and their application to textile materials.

According to the invention, there are provided water-soluble monoazo dyes which, in the form of the free acids, have the general formula:

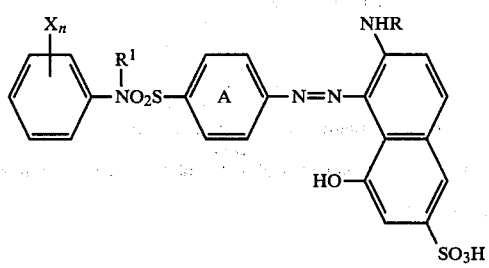

wherein ring A may optionally be substituted by halogen, trifluoromethyl, alkoxy, acylamino or alkyl having from 1 to 4 carbon atoms, R represents hydrogen or unbranched alkyl having from 1 to 4 carbon atoms, $R^1$ represents hydrogen, alkyl or hydroxyalkyl, X represents unbranched alkyl having from 1 to 6 carbon atoms, cycloalkyl, halogen, nitro, trifluoromethyl, sulpho, vinylsulphonyl, hydroxyethylsulphonyl, sulphatoethylsulphonyl, —$SO_2NHR^2$, wherein $R^2$ represents hydrogen or alkyl having from 1 to 4 carbon atoms, or -$COOR^3$ wherein $R^3$ represents hydrogen, alkyl having from 1 to 7 carbon atoms, cycloalkyl or aryl, and n represents an integer of from 0 to 3.

A preferred class of dyes of the invention consists of those dyes in which each of R and $R^1$ is hydrogen, ring A is unsubstituted, n is 0 to 3 and X is unbranched alkyl having from 1 to 6 carbon atoms.

A further preferred class consists of those dyes in which R is hydrogen, $R^1$ is hydroxyalkyl, n is 0 to 3 and X is unbranched alkyl having from 1 to 6 carbon atoms, ring A being unsubstituted.

The dyes of the invention may be prepared by diazotising an amine of the formula:

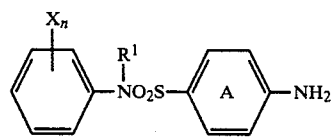

wherein A, $R^1$, X and n have the meanings given above, and coupling the resulting diazo compound, under acid conditions, with an aminonaphthol sulphonic acid of the formula:

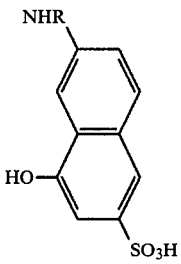

wherein R has the meaning given above.

Amines for use in making the dyes may be obtained by known methods, for example by reacting a sulphonyl chloride of the formula:

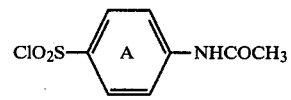

wherein A may be substituted as stated above, with a compound of the formula:

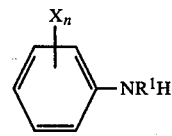

wherein $R^1$, X and n have the meanings given above, and then hydrolysing the acetylamino group to a primary amino group.

The reactions leading to the formation of the dyes of the invention may be performed using conditions that have been fully described in the prior art. Similarly, the dyes may be isolated by known methods and as in the case of other dyes containing sulphonic acid groups it is often convenient to isolate and use the dyes in the form of their water-soluble salts, particularly their alkali metal or ammonium salts and especially sodium salts. It is to be understood that the invention relates to both the free acids and their salts.

The dyes of the invention, singly or in the form of mixtures, are particularly suitable for applying to polyamide textile materials, for example nylon 66, nylon 6 and nylon 11, using any of the methods known for the application of acid dyes to such materials. The dyes give red shades having a high degree of thermal stability and fastness to wet treatments and to light.

The invention is illustrated but not limited by the following Examples in which all parts and percentages are by weight.

EXAMPLE 1

2.48 Parts of 4-aminobenzenesulphonanilide are dissolved in a mixture of 40 parts of glacial acetic acid and 4 parts of 35.5% hydrochloric acid. The solution is cooled to 0–5° C. and a solution of 0.70 parts of sodium nitrite in 5 parts of water is added dropwise. The mixture is stirred at 0–5° C. for 2 hours after which residual nitrous acid is destroyed by the addition of a 10% solution of sulphamic acid. The diazo solution is added dropwise to a solution of 2.5 parts of 2-amino-8-naphthol-6-sulphonic acid in 100 parts of ice/water, maintaining the pH at 2–3 during the addition by adding a solution of sodium acetate. When the coupling is complete, the product is filtered off. The filter cake is redissolved in 300 parts of water at 50° C. and the product is precipitated by the addition of sodium chloride to a concentration of 5%. The product is filtered off and dried.

When applied to polyamide materials, bright bluishred shades are obtained with excellent fastness to washing and to light.

EXAMPLE 2

2.92 Parts of 4-aminobenzenesulphon-N-(β-hydroxyethyl)anilide are diazotised as described in Example 1. The diazo solution is added dropwise to a solution of 2.5 parts of 2-amino-8-naphthol-6-sulphonic acid in 120 parts of ice/water, maintaining the pH at 2–3 during the addition by adding a solution of sodium acetate. When the coupling is complete the product is filtered off, washed with an aqueous solution containing 2% of sodium chloride and dried.

When applied to polyamide materials, bright red shades are obtained possessing excellent fastness to washing and to light.

Further examples of the invention are described in the table. The aminobenzenesulphonamides in Column I are coupled under acid conditions with the aminonaphtholsulphonic acids in Column II. The shades of the products when applied to polyamide materials are given in Column III.

TABLE

| Ex. | I | II | III |
|---|---|---|---|
| 3 | 4-aminobenzenesulphon-(2'-methyl)anilide | 2-amino-8-naphthol-6-sulphonic acid | Bluish-red |
| 4 | 4-aminobenzenesulphon-(4'-methyl)anilide | " | " |
| 5 | 4-aminobenzenesulphon-(2'-chloro)anilide | " | " |
| 6 | 4-aminobenzenesulphon-(2'-trifluoromethyl)-anilide | " | " |
| 7 | 4-aminobenzenesulphon-(4'-chloro-2'-trifluoromethyl)anilide | " | " |
| 8 | 4-aminobenzenesulphon-(2',4'-dimethyl)-anilide | " | " |
| 9 | 4-aminobenzenesulphon-(2',5'-dimethyl)-anilide | " | " |
| 10 | 4-aminobenzenesulphon-N-(β-hydroxyethyl)-anilide | 2-methylamino-8-naphthol-6-sulphonic acid | Rubine |
| 11 | 4-aminobenzenesulphonanilide | 2-methylamino-8-naphthol-6-sulphonic acid | " |
| 12 | 4-aminobenzenesulphon-(2',4'-dimethyl)-anilide | 2-methylamino-8-naphthol-6-sulphonic acid | " |
| 13 | 4-aminobenzenesulphonanilide-3'-sulphonic acid | 2-methylamino-8-naphthol-6-sulphonic acid | " |
| 14 | 4-aminobenzenesulphonanilide-3'-sulphonic acid | 2-amino-8-naphthol-6-sulphonic acid | Bluish-red |
| 15 | 4-aminobenzenesulphon-(4'-methoxycarbonyl)-anilide | " | " |
| 16 | 4-aminobenzenesulphon-(2',5'-dichloro)-anilide | " | " |
| 17 | 4-aminobenzenesulphon-(3'-sulphatoethyl)-sulphonyl)anilide | " | " |
| 18 | 4-aminobenzenesulphon-N-(β-hydroxypropyl)-anilide | " | " |

We claim:

1. A water-soluble monoazo dye which, in the form of the free acid, has the formula:

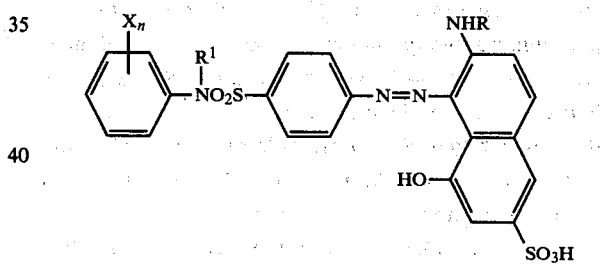

wherein R represents hydrogen or unbranched alkyl having from 1 to 4 carbon atoms, $R^1$ represents hydrogen, hydroxyethyl or hydroxypropyl, X represents unbranched alkyl having from 1 to 6 carbon atoms, chlorine, trifluoromethyl, sulpho, sulphatoethylsulphonyl or lower alkoxycarbonyloxy, and n represents an integer of from 0 to 2.

2. A water-soluble monoazo dye as set forth in claim 1 wherein R is hydrogen, $R^1$ is hydrogen, hydroxyethyl or hydroxypropyl and n is 0.

* * * * *